(12) United States Patent
de Cesare et al.

(10) Patent No.: US 9,262,353 B2
(45) Date of Patent: Feb. 16, 2016

(54) INTERRUPT DISTRIBUTION SCHEME

(71) Applicant: Apple Inc., Cupertino, CA (US)

(72) Inventors: Josh P. de Cesare, Campbell, CA (US);
Ruchi Wadhawan, Saratoga, CA (US);
Erik P. Machnicki, San Jose, CA (US);
Mark D. Hayter, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 14/590,203

(22) Filed: Jan. 6, 2015

(65) Prior Publication Data

US 2015/0113193 A1      Apr. 23, 2015

Related U.S. Application Data

(63) Continuation of application No. 12/962,146, filed on Dec. 7, 2010, now Pat. No. 8,959,270.

(51) Int. Cl.
*G06F 13/24* (2006.01)

(52) U.S. Cl.
CPC ........ *G06F 13/24* (2013.01); *G06F 2213/2424* (2013.01); *Y02B 60/1228* (2013.01)

(58) Field of Classification Search
CPC ...................................................... G06F 13/24
See application file for complete search history.

(56) References Cited

U.S. PATENT DOCUMENTS

| | | | |
|---|---|---|---|
| 3,623,014 A * | 11/1971 | Doelz | .................... G06F 11/076 714/6.12 |
| 5,517,626 A | 5/1996 | Archer et al. | |
| 5,870,621 A | 2/1999 | Walsh et al. | |
| 5,918,057 A | 6/1999 | Chou et al. | |
| 5,953,516 A | 9/1999 | Bonola | |
| 6,041,377 A | 3/2000 | Mayer et al. | |

(Continued)

FOREIGN PATENT DOCUMENTS

| | | |
|---|---|---|
| EP | 2 241 979 | 11/2010 |
| JP | 2003281112 | 10/2003 |

(Continued)

OTHER PUBLICATIONS

Notice of Acceptance from Australian Application No. 2011338863, issued Dec. 17, 2014, pp. 1-2.

(Continued)

*Primary Examiner* — Nimesh G Patel
(74) *Attorney, Agent, or Firm* — Meyertons, Hood, Kivlin, Kowert & Goetzel, P.C.; Lawrence J. Merkel

(57) ABSTRACT

In one embodiment, an interrupt controller may implement an interrupt distribution scheme for distributing interrupts among multiple processors. The scheme may take into account various processor state in determining which processor should receive a given interrupt. For example, the processor state may include whether or not the processor is in a sleep state, whether or not interrupts are enabled, whether or not the processor has responded to previous interrupts, etc. The interrupt controller may implement timeout mechanisms to detect that an interrupt is being delayed (e.g. after being offered to a processor). The interrupt may be re-evaluated at the expiration of a timeout, and potentially offered to another processor. The interrupt controller may be configured to automatically, and atomically, mask an interrupt in response to delivering an interrupt vector for the interrupt to a responding processor.

15 Claims, 8 Drawing Sheets

(56) References Cited

U.S. PATENT DOCUMENTS

| | | | |
|---|---|---|---|
| 6,105,102 | A | 8/2000 | Williams et al. |
| 6,115,778 | A | 9/2000 | Miyake et al. |
| 6,170,025 | B1 | 1/2001 | Drottar et al. |
| 6,175,890 | B1 | 1/2001 | Yamaura |
| 6,418,497 | B1 | 7/2002 | Guthrie et al. |
| 6,701,429 | B1 | 3/2004 | Gustafsson et al. |
| 6,772,257 | B1 | 8/2004 | Futral |
| 6,792,492 | B1 | 9/2004 | Griffin |
| 7,328,295 | B2 | 2/2008 | Yiu et al. |
| 7,398,343 | B1 | 7/2008 | Marmash et al. |
| 7,707,343 | B2 | 4/2010 | Sato |
| 7,721,034 | B2 | 5/2010 | Wang et al. |
| 7,882,293 | B2 | 2/2011 | Burdass et al. |
| 8,015,337 | B2 | 9/2011 | Kocherry et al. |
| 8,032,681 | B2 | 10/2011 | Crossland et al. |
| 8,458,386 | B2 | 6/2013 | Smith et al. |
| 8,661,167 | B2 * | 2/2014 | Hsin et al. .................. 710/25 |
| 2002/0116563 | A1 | 8/2002 | Lever |
| 2003/0061423 | A1 | 3/2003 | Rankin et al. |
| 2003/0065497 | A1 * | 4/2003 | Rhoads .................... 703/18 |
| 2003/0105798 | A1 | 6/2003 | Kim et al. |
| 2004/0117532 | A1 | 6/2004 | Bennett et al. |
| 2005/0010707 | A1 | 1/2005 | Francis |
| 2005/0125580 | A1 | 6/2005 | Madukkarumukumana et al. |
| 2006/0095609 | A1 | 5/2006 | Radhakrishnan et al. |
| 2007/0143514 | A1 * | 6/2007 | Kaushik et al. ........... 710/260 |
| 2008/0046574 | A1 * | 2/2008 | Kinoshita et al. ......... 709/228 |
| 2009/0031058 | A1 | 1/2009 | Radhakrishnan et al. |
| 2009/0070510 | A1 | 3/2009 | Crossland et al. |
| 2009/0089470 | A1 | 4/2009 | Ven |
| 2009/0157936 | A1 | 6/2009 | Goss |
| 2009/0172423 | A1 | 7/2009 | Song et al. |
| 2009/0300288 | A1 | 12/2009 | Lefebvre et al. |
| 2010/0057967 | A1 | 3/2010 | Murakami et al. |
| 2010/0095039 | A1 | 4/2010 | Marietta et al. |
| 2010/0223611 | A1 * | 9/2010 | Mahalingam et al. ........ 718/1 |
| 2010/0262742 | A1 * | 10/2010 | Wolfe ..................... 710/265 |
| 2010/0274941 | A1 | 10/2010 | Wolfe |

FOREIGN PATENT DOCUMENTS

| | | |
|---|---|---|
| JP | 2009193525 | 8/2009 |
| WO | 2010028964 | 3/2010 |

OTHER PUBLICATIONS

U.S. Appl. No. 12/962,089, filed Dec. 7, 2010, Michael J. Smith.

"The Open Programmable Interrupt Controller (PIC) Register Interface Specification," Revision 1.2, Issued Oct. 1995, Advanced Micro Devices and Cyrix, Inc., 24 pages.

Intel, "Embedded Pentium Processor Family," Developer's Manual, Dec. 1998, 330 pages.

Intel, "Intel 64 and IA-32 Architectures Software Developer's Manual," vol. 3A System Programming Guide, Part 1, Jan. 2011, 70 pages.

U.S. Appl. No. 12/962,146, filed Dec. 7, 2010, Josh P. de Cesare.

Office Action from Australian Application No. 2011338863, issued Nov. 3, 2014, pp. 1-4.

PreAppeal Review Report from Japanese Patent Application No. JP 2013-543183, issued Mar. 4, 2015, Apple Inc., pp. 1-5.

Office Action from Japanese Patent Application No. JP 2013-543183, issued Oct. 5, 2015, Apple Inc., pp. 1-4.

* cited by examiner

INTERRUPT DISTRIBUTION SCHEME

This application is a continuation of U.S. patent application Ser. No. 12/962,146, filed on Dec. 7, 2010 and now U.S. Pat. No. 8,959,270, which is incorporated herein by reference in its entirety.

BACKGROUND

1. Technical Field

Embodiments described herein are related to the field of interrupt controllers.

2. Description of the Related Art

Digital systems generally include one or more processors that execute software, and various hardware devices that can be controlled by the software. For example, digital systems include computer systems such as desktops, laptops, net tops, servers, workstations, etc.; mobile devices such as cellular phones, personal digital assistants, smart phones, etc.; and other special purpose devices. The hardware devices may generally provide certain functionality such as storage (e.g. disk drives, flash memory, optical drives, etc.), communications (e.g. networking, wireless operation, etc.), and other input/output functionality (touch screen, keyboard, mouse, display, audio, etc.).

The hardware devices are typically designed to operate for a period of time without software intervention. When software intervention is needed (e.g. when a driver corresponding to the device needs to be executed), the hardware devices may signal an interrupt. The interrupt is delivered to one of the processors in the system, which can suspend execution of a task to execute code corresponding to the interrupt (e.g. interrupt service routine code and/or driver code).

When systems include more than one processor, a given interrupt needs to be provided to one (and only one) of the processors. A static distribution scheme can be used, in which each device's interrupt is mapped to a particular processor, and the mapping is not changed very frequently. That is, the same processor generally services the given interrupt. Such static schemes can result in long interrupt latencies if the targeted processor is not able to respond to the interrupt immediately. If multiple processors can receive a given interrupt, there is a race condition when the processors attempt to respond to the interrupt. Such race conditions can reduce performance and/or power efficiency in the system.

SUMMARY

In one embodiment, an interrupt controller may implement an interrupt distribution scheme for distributing interrupts among multiple processors. The scheme may take into account various processor state in determining which processor should receive a given interrupt. For example, the processor state may include whether or not the processor is in a sleep state, whether or not interrupts are enabled, whether or not the processor has responded to previous interrupts, etc. By taking processor state into account when distributing interrupts, interrupt latency may be reduced in some embodiments. Alternatively or in addition, the interrupt controller may implement timeout mechanisms to detect that an interrupt is being delayed (e.g. after being offered to a processor). The interrupt may be re-evaluated at the expiration of a timeout, and potentially offered to another processor.

In an embodiment, an interrupt controller may be configured to automatically, and atomically, mask an interrupt in response to delivering an interrupt vector for the interrupt to a responding processor. The interrupt controller may serialize the interrupt acknowledgements from the processors as part of the atomic masking. Accordingly, each interrupt is delivered to one processor, and no more than one processor, in such embodiments.

BRIEF DESCRIPTION OF THE DRAWINGS

The following detailed description makes reference to the accompanying drawings, which are now briefly described.

Figure 1:
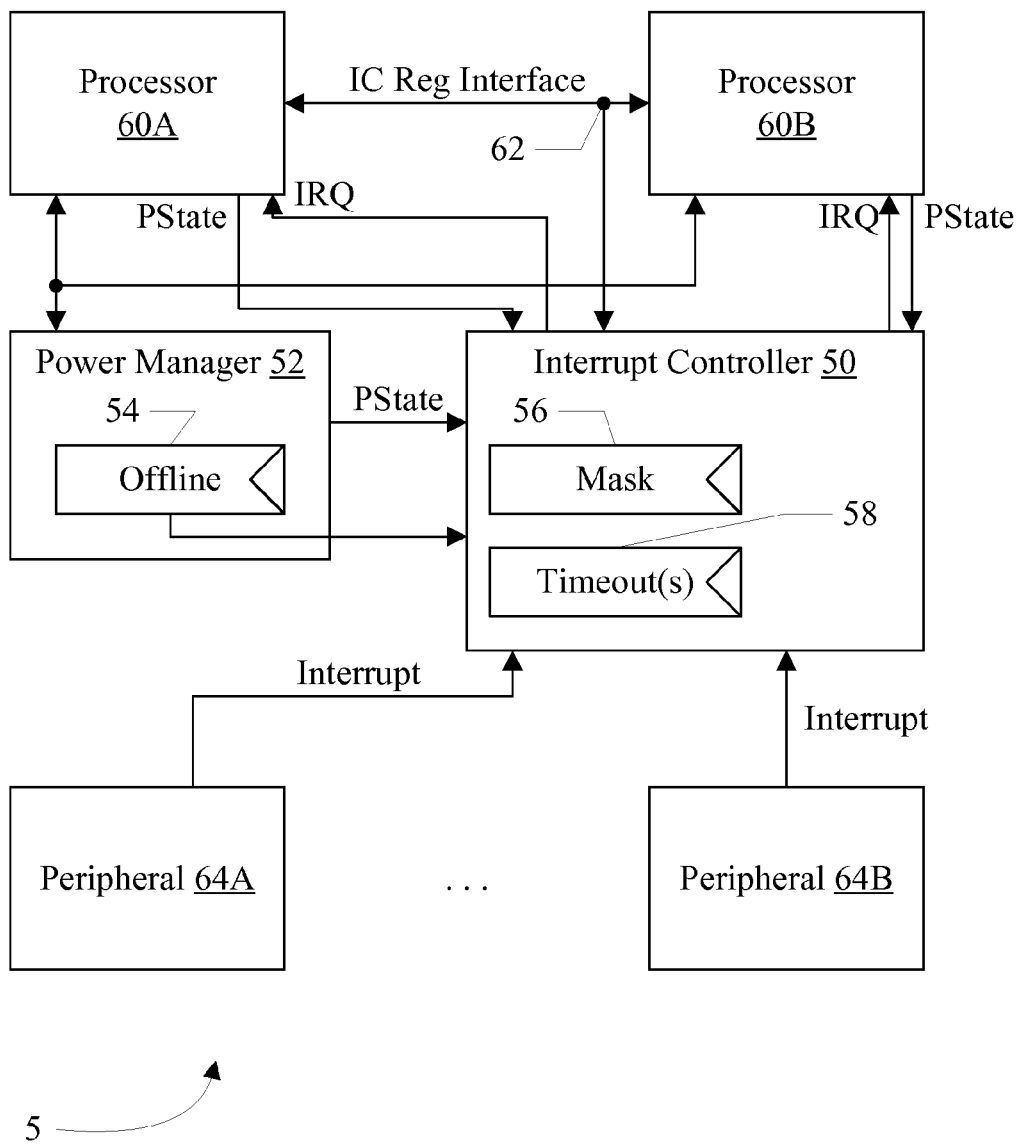
FIG. 1 is a block diagram of one embodiment of a system including processors, an interrupt controller, and various devices that source interrupts.

While the embodiments described herein are susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Various embodiments are described below for handling interrupts in a system. In general, an interrupt may be a communication from a device (e.g. a peripheral device) to a processor to cause the processor to suspend execution of the code that the processor is currently executing in order to execute code corresponding to the interrupt. The communication of the interrupt from the device may be in various forms (e.g. assertion of a signal, transmission of an interrupt message, etc.). The device may use the interrupt to cause interrupt service routine code and/or driver code for the device to be executed. The processing of the suspended code may continue once the processor has taken at least some steps to process the interrupt. In some cases, the suspended code may remain suspended until the interrupt is fully processed. In other cases, a deferred interrupt processing scheme may be employed in which the interrupt service routine code logs the interrupt for later processing, then returns to the suspended code.

The interrupt controller may receive interrupts from the various devices in the system, and may offer interrupts to the processors. Offering an interrupt may generally refer to transmitting an indication of the interrupt to the processor. In some embodiments, the interrupt may be offered by asserting an interrupt request signal to the processor. In other embodiments, the interrupt may be offered by transmitting a message to the processor identifying the interrupt. The processor may respond to the interrupt in a variety of fashions. For example, a processor may transmit an interrupt acknowledgement to indicate acceptance of the interrupt. The interrupt acknowledgement may be transmitted in a variety of forms. For example, the interrupt acknowledgement may be a register read to a register designated as the interrupt acknowledgement register. The interrupt acknowledgement may be a specific transmission on the interface of the processors. In other embodiments, the processors may communicate either acceptance or rejection of an interrupt.

As will be highlighted in more detail below, in some embodiments, the interrupt controller may consider various processor state that may affect the ability of the processor to accept interrupts (or to accept interrupts with low latency). Thus, the interrupt controller may dynamically identify a processor to accept a given interrupt, based on the processor state in the various processors at the time of the given interrupt. A subsequent occurrence of the same interrupt may be provided to a different processor based on different processor state at the time of the subsequent occurrence. In some embodiments, selecting a processor based on the processor state may lead to lower overall interrupt latency. Generally, the processor state may include state that is programmed directly into the processor (e.g. interrupt enable/disable, privilege level, etc.) and/or state that is directly applied to the processor (e.g. power gating, clock gating, etc.).

In some embodiments, the interrupt controller may be configured to atomically mask an interrupt in response to the interrupt being accepted by a processor. In this fashion, the interrupt controller may avoid transmitting the same interrupt to more than one processor. Additionally, the source of the interrupt may be level sensitive, and thus the interrupt may remain asserted until the source receives the desired processing. The mask may prevent the interrupt from being reported again until the mask is explicitly changed by software. The automatic masking of interrupts may also permit the interrupt acknowledgement to be stateless. The interrupt controller need not be aware of whether or not the processor is in the middle of processing an interrupt, for example. Accordingly, the design of the interrupt controller may be simplified as compared to other interrupt mechanisms.

FIG. 1 is a block diagram of one embodiment of a system 5 including multiple processors 60A-60B, an interrupt controller 50, a power manager 52, and multiple peripherals 64A-64B. The peripherals 64A-64B may be coupled to the interrupt controller 50 and may be configured to signal interrupts to the interrupt controller 50 ("Interrupt" in FIG. 1). The power manager 52 may include an offline register 54 and may be coupled to the interrupt controller 50. Particularly, the contents of the offline register 54 and additional processor state ("PState" in FIG. 1) related to the processors 60A-60B may be provided by the power manager 52 to the interrupt controller 50. The processors 60A-60B may be coupled to the power manager 52 and to the interrupt controller 50. Particularly, the processors 60A-60B may each provide additional processor state ("PState") to the interrupt controller 50, and may each receive an interrupt request ("IRQ") from the interrupt controller 50. The processors 60A-60B and the interrupt controller 50 may additionally be coupled via an interrupt controller register interface 62 ("IC Reg Interface" in FIG. 1). The interrupt controller 50 may further include a mask register 56 and at least one timeout register 58.

In an embodiment, the interrupt controller 50 is coupled to receive the PState of the processors 60A-60B, and is configured to include the PState in determining which processor 60A-60B should be offered an interrupt. Accordingly, the selected processor 60A-60B may be dynamically determined for a given interrupt, dependent on the current PStates associated with the processors. The interrupt controller 50 may offer the interrupt to the selected processor 60A-60B (e.g. by asserting the IRQ to the selected processor 60A-60B in FIG. 1). The processor 60A-60B may accept the interrupt, for example by transmitting an interrupt acknowledgement (IAck) to the interrupt controller 50. By including processor state in the decision to route an interrupt to a given processor 60A-60B, the latency for interrupt processing overall may be reduced by reducing the latency from the offering of the interrupt to the processor 60A-60B to that processor accepting the interrupt.

The processor state that is monitored by the interrupt controller 50 may include any state which may affect the ability of the processor to respond to an interrupt. For example, the processor state from the power manager 52 may include the power state of the processors. If a processor 60A-60B is in a low power state, such as a sleep state, that processor may need time to transition to a higher power state, such as a full on state, to respond to the interrupt. Accordingly, a processor which is already in the higher power state may be a better choice for offering the interrupt. The processor state from the power manager 52 may further include the offline state from the offline register 54. The offline state may be programmed by software executing on the system 5. If a given processor is indicated as offline in the offline register 54, that processor may be unavailable to service interrupts and thus may not be selected to be offered the interrupt.

The processor state from the processors 60A-60B may include an indication of whether or not interrupts are currently enabled in that processor. A processor which currently has interrupts disabled may be less likely to quickly accept an offered interrupt than a processor which currently has interrupts enabled. In one embodiment, the processors 60A-60B may include a register that stores an interrupt enable or interrupt disable bit. The bit may be output by the processors 60A-60B for external monitoring. Other processor state from the processors 60A-60B may include, for example, an indication of the privilege state of the processor. A processor in a low privileged state (e.g. user state) may be executing application code, while a processor in higher privileged state (e.g. supervisor state) may be executing operating system code. A processor in a lower privilege state may be a better choice for offering the interrupt than a processor in a higher privilege state. Any other processor state may be considered in various embodiments.

In embodiments that support virtualization of processors and interrupt controllers, additional processor state may be considered for routing interrupts. In such environments, a peripheral device (and thus its interrupt) may be private to a guest operating system (OS). That is, the device may be assigned to the guest OS, and may not be available for use by other guest OSs that are executing on the system until the device is no longer assigned to that guest OS. For an interrupt that is private to a guest OS, interrupt latency may be shortened if the interrupt is routed to one of the processors that is already executing that guest OS. Each processor may be configured to provide an indication of which guest OS is executing on that processor to the interrupt controller (e.g. a guest tag), and the interrupt controller may be configured to consider that indication in selecting a processor to route the interrupt to. A timeout may be supported to determine that the selected processor did not respond to the interrupt, and a processor executing the hypervisor/virtual machine monitor may be selected in response to the timeout. If no processor is executing the desired guest OS, a processor may be selected using the remaining routing rules. In some embodiments, a different interrupt indication may be used to interrupt the hypervisor/virtual machine monitor (e.g. there may be a separate IRQ for each of the hypervisor/virtual machine monitor and the guest). In such embodiments, the hypervisor/virtual machine monitor IRQ may be asserted in the desired guest OS is not being executed on any processor.

In an embodiment, the interrupt controller 50 may support one or more timeouts. In response to offering an interrupt to a selected processor, the interrupt controller 50 may initialize a timeout counter with a corresponding timeout value from the timeout register 58. If the timeout expires without the selected processor responding to the interrupt, the interrupt controller 50 may re-evaluate the interrupt and offer the interrupt to another processor. Accordingly, if the originally selected processor is delayed in responding, another processor may be selected and may respond. In one embodiment, the offer is not rescinded from the previously selected processor. Accordingly, whichever processor responds first may be provided with the interrupt. In other embodiments, the offer may be rescinded from the previously selected processor (e.g. by deasserting its IRQ).

The timeouts may be software programmable, and may be based on the expected latencies of certain events. For example, if interrupts are disabled in a processor, they may remain disabled for a typical amount of time (e.g. 20 microseconds). The timeout may be programmed to be slightly longer than the typical time, so that the processor may enable interrupts and accept the interrupt before the timeout occurs if interrupts are disabled for the typical amount of time. If a processor is in a low power state, a certain amount of time may elapse while the processor is brought out of the low power state (e.g. 60 microseconds). The timeout may programmed to be slightly longer than this amount of time, so that the processor may reach the full on state and accept the interrupt before the timeout occurs.

In an embodiment, multiple timeout values may be supported and may be programmed into the timeout registers 58. Each timeout value may correspond to a processor state and the associated interrupt acceptance latency. In response to selecting a processor to offer an interrupt to, the interrupt controller 50 may initialize a timeout counter with the timeout that corresponds to that processor's state. In another embodiment, the timeout value may depend both on the current state of the selected processor, but may also depend on the current state of the next processor that is likely to be selected if the currently-selected processor times out. If an interrupt is offered to a processor and the timeout expires prior to the processor performing the interrupt acknowledgement, the processor may be viewed as non-responsive and the non-responsiveness of the processor may affect subsequent interrupt routing operations.

In addition to the timeout values measured for each processor (from IRQ assertion to interrupt acceptance via an interrupt acknowledgement, for example), a timeout may be measured for each interrupt. The interrupt timeout may be measured from the routing of an interrupt to a given processor to the servicing of the interrupt. Expiration of the interrupt timeout may lead to the interrupt being re-evaluated and the interrupt offered to a different processor, similar to the expiration of a timeout for the processor discussed above. In an embodiment, the interrupt timeout may not cause a processor to be viewed as non-responsive, and thus may not affect subsequent interrupt routing operations.

In an embodiment, the interrupt controller 50 may atomically mask an interrupt that is delivered to a processor in response to an interrupt acknowledgement from the processor. The interrupt controller 50 may include the mask register 56, which may include a mask bit for each interrupt supported by the interrupt controller 50. The interrupt controller 50 may set the mask bit to a mask state to mask the interrupt. The mask bit may also be set to an unmask state to not mask the interrupt. In an embodiment, the mask state is the set state and the unmask state is the clear state, although the opposite state assignments may be used in other embodiments.

To atomically mask an interrupt, the mask of the interrupt takes effect such that the interrupt will not be provided in response to a subsequent interrupt acknowledgement even if that subsequent interrupt acknowledgement is received as soon as possible. If there is pipelining in the interrupt controller 50, for example, the effects of the masking may be pipelined all the way through before the subsequent interrupt acknowledgement may access the interrupt state. In one embodiment, the interrupt controller 50 may serialize interrupt acknowledgements, preventing one interrupt acknowledgement from detecting an interrupt that is to be masked by a previous interrupt acknowledgement. It is noted that the atomic masking of interrupts may be implemented independent of the processor-state aware interrupt routing discussed above, and may be implemented in single processor embodiments as well.

As mentioned above, the offline state may be programmable by software executing in the system 5 (e.g. on the processors 60A-60B) to indicate that certain processors are unavailable for interrupts. By contrast, a processor in a low power state may experience longer latency in accepting interrupts, but the low-power-state processor is still available for interrupts. In an embodiment, the interrupt controller 50 does not offer an interrupt to an offline processor. There may be a variety of reasons that cause software to prevent the routing of interrupts to a given processor by taking it offline. For example, a processor may be executing an important code sequence, and it may be desirable from a simplicity standpoint or a security standpoint to prevent interrupts. The code sequence may be the boot code sequence, for example. Other code sequences that may be deemed important are code sequences that access sensitive memory locations such as locations where secrets are stored. Other examples may be power-related. That is, it may be more power efficient for the system as a whole if the processor is offline. There may not be enough room in the thermal envelope of the system to have the processor online. That is, the temperature may increase too much if the processor were online.

As discussed above, the interrupt controller 50 may be configured to offer an interrupt to a processor. In the illustrated embodiment, the IRQ signal may be asserted to offer an interrupt. Other embodiments may communicate an interrupt message to the processor, which may capture and acknowledge the message. The processor may respond to the offer in any desired fashion. For example, the interrupt acknowledgement (IAck) discussed above may be transmitted. Any positive affirmation that the processor is accepting an interrupt offered by the interrupt controller may constitute a response. Still other embodiments may explicitly accept or reject an offered interrupt.

The peripheral devices 64A-64B may include any desired input/output devices or other hardware devices that are included in the system 5. For example, the peripherals 64A-64B may include networking peripherals such as one or more networking media access controllers (MAC) such as an Ethernet MAC or a wireless fidelity (WiFi) controller. An audio unit including various audio processing devices may be included in the peripherals 64A-64B. One or more digital signal processors may be included in the peripherals 64A-64B. The peripherals 64A-64B may include any other desired functional such as timers, an on-chip secrets memory, an encryption engine, etc., or any combination thereof. The peripherals 64A-64B may include graphics processing hardware, video processing hardware, video encoders/decoders and/or display hardware.

Each peripheral device 64A-64B may communicate one or more interrupts to the interrupt controller 50. In the illustrated embodiment, each peripheral device 64A-64B may include an interrupt signal to signal an interrupt to the interrupt controller 50. Some devices may include multiple interrupt signals. Still further, other devices may use an interrupt message to convey the interrupt and related state, if any.

The processors 60A-60B may implement any instruction set architecture, and may be configured to execute instructions defined in that instruction set architecture. The processors 60A-60B may employ any microarchitecture, including scalar, superscalar, pipelined, superpipelined, out of order, in order, speculative, non-speculative, etc., or combinations thereof. The processors 60A-60B may include circuitry, and optionally may implement microcoding techniques. The processors 60A-60B need not be symmetrical. That is, the processors 60A-60B may be different, may implement different instruction sets, etc. For example, the processors 60A-60B may include general purpose central processing units (CPUs), special purpose processors, embedded processors, digital signal processors, etc.

In addition to providing PState to the interrupt controller 50 and receiving IRQs from the interrupt controller 50, the processors 60A-60B may implement the interface 62 to communicate with the interrupt controller 50. The interconnect 62 may convey register access operations (e.g. reads and writes) between the processors 60A-60B and the interrupt controller 50. These operations may include an address, which may be decoded by the interrupt controller 50 to identify the register being read/written. The addresses may be part of the memory address space of the processors 60A-60B (that is, the registers may be memory-mapped). Alternatively, the addresses may be part of a configuration space, an I/O space, or any other address space.

One of the register access operations may be a read operation to an IAck register. The IAck register read may be the interrupt acknowledgement discussed above, and the data returned in response to the IAck register read may be the interrupt vector corresponding to the interrupt being delivered to the processor. Other register access operations may be reads or writes of the offline register 54 and the timeouts register(s) 58. The mask register 56 may be updated using two register write operations. A write to a set mask register may set one or more mask bits in the mask register (e.g. place the identified mask bits in the mask state). A write to a clear mask register may clear one or more mask bits (e.g. place the identified mask bits in the unmask state). The set mask register and clear mask register may have different addresses that may be decoded by the interrupt controller 50 to set or clear bits in the mask register. That is, the set mask register and clear mask register may not physically exist, but instead may specify operations to occur on the mask register. Similarly, the IAck register may not physically exist, but may result in the delivery of an interrupt vector to the processor that reads the register. Other register access operations may read/write other registers in the interrupt controller 50 (not shown in FIG. 1).

The interface 62 may have any configuration. For example, the interface 62 may be a general purpose interface (e.g. bus, point-to-point interconnect, etc.) that is also used to transmit memory operations and other types of operations from the processors 60A-60B. The interface 62 may pass through one or more other units between the processors 60A-60B and the interrupt controller 50. For example, in an embodiment shown in FIG. 10, the interface may pass through a bridge/DMA unit.

As mentioned above, the processors 60A-60B may be in a variety of power states. In a full on state, the processor may be ready to execute instructions and may accept interrupts. The full on state may include multiple voltage/frequency pairs at which operation may be supported (e.g. depending on the workload, available power, etc.). There may also be one or more low power states. In a low power state, the processor 60A-60B may be idle (not executing instructions) and a period of time may be needed to transition to the full on state. The period of time to transition may be dependent on the particular low power state. For example, the processor may be clock-gated, in which the clocks are not toggling in the processor. A few cycles may be needed to restart the clocks and prepare the processor for execution. In another low power state, the power to the logic circuitry in the processor may be gated, but memory arrays such as caches in the processor may still be powered. Returning from such a power gated state to the full on state may include powering up the logic circuitry and waiting for the power to stabilize. In yet another low power state, the power to the processor logic circuitry and memory arrays may be gated. Returning from such a power gated state may include powering up the circuitry, and also may include initializing the memory arrays. Other low power states may be possible. The various low power states may also be referred to as sleep states in the processor.

It is noted that various interconnect in the system 5 is shown in FIG. 1 related to the processing of interrupts. However, various other interconnect may be provided, as desired. Additionally, various other components may be provided in the system 5 (e.g. a memory controller, memory coupled to the memory controller, etc.). It is further noted that one or more of the components illustrated in FIG. 1 and/or other components may be integrated onto a single integrated circuit as a system on a chip. There may be any number of the various components shown in FIG. 1 (e.g. any number of processors 60A-60B, any number of peripherals 64A-64B, etc.).

Figures 2, 3:
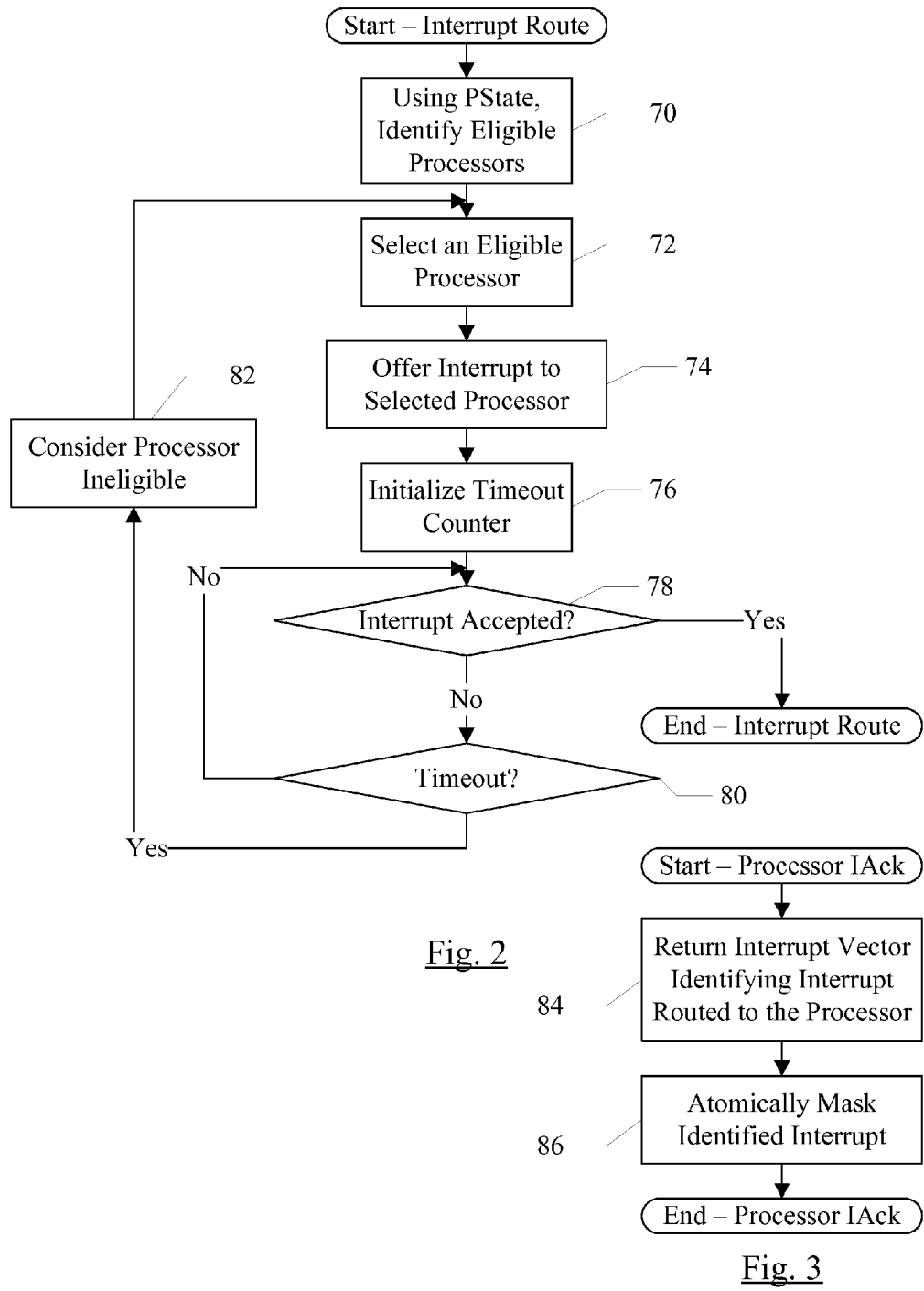
FIG. 2 is a flowchart illustrating operation of one embodiment of an interrupt controller to route an interrupt to a processor.
FIG. 3 is a flowchart illustrating operation of one embodiment of an interrupt controller in response to an interrupt acknowledgement from a processor.

Turning now to FIG. 2, a flowchart is shown illustrating operation of one embodiment of the interrupt controller 50 to route an interrupt to a processor. While the blocks are shown in a particular order for ease of understanding, other orders may be used. Blocks may be performed in parallel in combinatorial logic in the interrupt controller 50. Blocks, combinations of blocks, and/or the flowchart as a whole may be pipelined over multiple clock cycles. The interrupt controller 50 may be configured to implement the operation illustrated in FIG. 2.

Using the PState corresponding to the various processors 60A-60B, the interrupt controller 50 may be configured to identify which of the processors 60A-60B are eligible to be offered an interrupt (block 70). A given processor may be eligible to be offered an interrupt if the PState of the processor (possibly as compared to the PState of other processors) indicates that it is acceptable to offer the interrupt to that processor. Some processors may be ineligible. For example, a processor that has already been offered the interrupt and which timed out may not be eligible for the interrupt. In embodiments that implement a communication to reject an interrupt in addition to accepting an interrupt, a processor that has rejected the interrupt may not be eligible. A processor that is offline may be not be eligible. Additionally, a given interrupt may be specified to target a subset of the processors 60A-60B (e.g. as part of the interrupt message or via programmable state associated with the interrupt). Non-targeted processors may not be eligible.

The interrupt controller 50 may be configured to select one of the eligible processors (block 72), and to offer the interrupt to the selected processor (e.g. asserting the IRQ to the selected processor) (block 74). The interrupt controller 50 may be configured to initialize a timeout counter for the selected processor, possibly based on the PState of the selected processor in some embodiments (block 76). The interrupt controller 50 may be configured to determine if the interrupt has been accepted (decision block 78). For example, the interrupt controller 50 may detect the interrupt acknowledgement from a processor. If the interrupt is accepted (decision block 78, "yes" leg), routing of the interrupt may be completed. If the interrupt is not yet accepted (decision block 78, "no" leg) and the timeout for the processor to which the interrupt is currently offered has not expired (decision block 80, "no" leg), the interrupt controller 50 may continue checking for the timeout and the interrupt acceptance. If the interrupt is not yet accepted (decision block 78, "no" leg) and the timeout for the processor to which the interrupt is offered is detected (decision block 80, "yes" leg), the interrupt controller 50 may consider the processor ineligible for the interrupt (block 82), and may select another eligible processor (block 72) to offer the interrupt to (block 74).

Turning next to FIG. 3, a flowchart is shown illustrating operation of one embodiment of the interrupt controller 50 in response to an interrupt acknowledgement (IAck). While the blocks are shown in a particular order for ease of understanding, other orders may be used. Blocks may be performed in parallel in combinatorial logic in the interrupt controller 50. Blocks, combinations of blocks, and/or the flowchart as a whole may be pipelined over multiple clock cycles. The interrupt controller 50 may be configured to implement the operation illustrated in FIG. 3.

The interrupt controller 50 may return the interrupt vector identifying the interrupt routed to the processor (block 84). If more than one interrupt is concurrently offered to the processor, the interrupt controller 50 may select one of the offered interrupts. For example, the lowest numbered interrupt vector may be selected, or the highest numbered interrupt may be accepted. The oldest interrupt may be selected, in another example. In embodiments that implement a priority among the interrupts, the highest priority interrupt may be selected. An interrupt may be randomly selected. The interrupt controller 50 may also atomically mask the interrupt identified by the interrupt vector (block 86).

Figure 4:
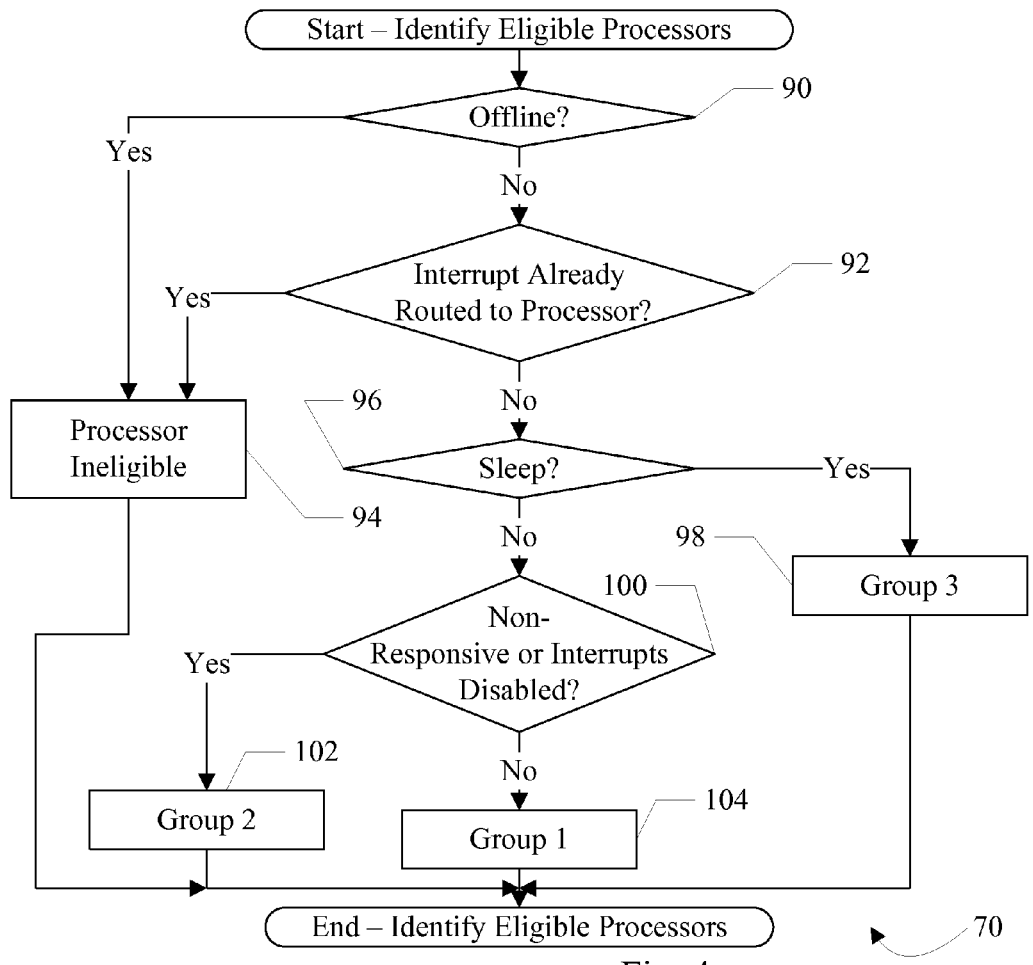
FIG. 4 is a flowchart illustrating operation of one embodiment of an interrupt controller to identify eligible processors for an interrupt.

Turning next to FIG. 4, a flowchart is shown illustrating one embodiment of identifying eligible processors by the interrupt controller 50 (block 70 from FIG. 2). While the blocks are shown in a particular order for ease of understanding, other orders may be used. Blocks may be performed in parallel in combinatorial logic in the interrupt controller 50. Blocks, combinations of blocks, and/or the flowchart as a whole may be pipelined over multiple clock cycles. The interrupt controller 50 may be configured to implement the operation illustrated in FIG. 4 for each processor in the system.

If the processor is offline (as indicated in the offline register) or if the interrupt has already been routed to the processor (decision block 90, "yes" leg and decision block 92, "yes" leg), the interrupt controller may be configured to identify the processor as ineligible (block 94). If not, and the processor is in a sleep state or other low power state (decision block 96, "yes" leg), the interrupt controller 50 may be configured to identify the processor as eligible and include the processor in eligibility group 3 (block 98). If the processor is not offline, not already routed, and not in the sleep state (decision blocks 90, 92, and 96, "no" legs), and the processor is either non-responsive or interrupts are disabled in the processor (decision block 100, "yes" leg), the interrupt controller 50 may be configured to identify the processor as eligible and include the processor in eligibility group 2 (block 102).

As mentioned previously, in some embodiments, a subset of the processors 60A-60B may be identified as targeted by a given interrupt. In such embodiments, only processors that are included in the targeted subset may be eligible processors. Processors not in the targeted subset may be treated in a similar fashion to offline processors, in that they may not be selected to be offered the interrupt.

In embodiments that implement priority for interrupts, the priority may be factored into identifying eligible processors as well. For example, a processor may be viewed as not eligible for an interrupt (or less eligible than some other processors) if that processor is currently processing a higher priority interrupt. A processor that is processing a lower priority interrupt may be interrupted to process a higher priority interrupt, and thus may be considered eligible for the higher priority interrupt.

The groupings of eligible processors may be in order or preference for offering an interrupt, with group 1 being most preferred; group 2 being next most preferred; and group 3 being least preferred among the eligible processors. Group 1 processors are not in a low power state, are responsive to interrupts, and do not have interrupts disabled, so they may be most likely to accept an offered interrupt with low latency. Group 2 processors are also not in a low power state but may be non-responsive or may currently have interrupts disabled. Accordingly, higher latency may be expected than group 1, on average. Group 3 processors are in a low power state, and thus the highest latency may be expected, on average, for this group.

Figure 5:
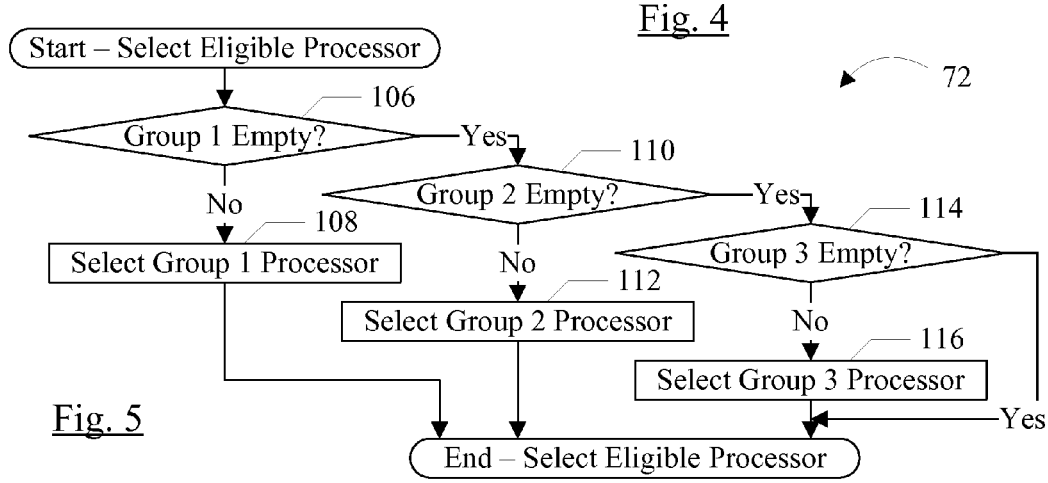
FIG. 5 is a flowchart illustrating operation of one embodiment of an interrupt controller to select an eligible processor.

Based on the above discussion, the flowchart of FIG. 5 may illustrate one embodiment of selecting an eligible processor in the interrupt controller 50 (block 72 in FIG. 2). While the blocks are shown in a particular order for ease of understanding, other orders may be used. Blocks may be performed in parallel in combinatorial logic in the interrupt controller 50. Blocks, combinations of blocks, and/or the flowchart as a whole may be pipelined over multiple clock cycles. The interrupt controller 50 may be configured to implement the operation illustrated in FIG. 5.

If group 1 is not empty (decision block 106, "no" leg), the interrupt controller 50 may be configured to select a processor from group 1 (block 108). If group 1 is empty and group 2 is not empty (decision block 106, "yes" leg and decision block 110, "no" leg), the interrupt controller 50 may be configured to select a processor from group 2 (block 112). If groups 1 and 2 are empty and group 3 is not empty (decision blocks 106 and 10, "yes" legs and decision block 114, "no" leg), the interrupt controller 50 may be configured to select a processor from group 3 (block 116). Within a given group, any eligible processor may be selected. For example, the lowest-numbered processor may be selected, or the highest-numbered processor may be selected. A processor may be randomly selected, or a processor that has not been selected recently may be selected.

Figure 6:
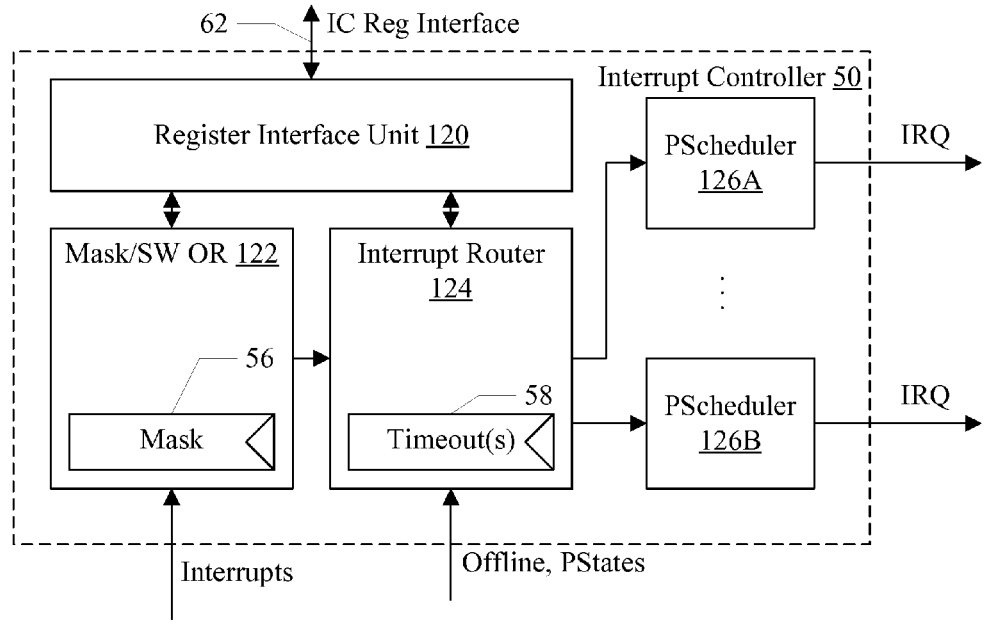
FIG. 6 is a block diagram of one embodiment of an interrupt controller in greater detail.

Turning now to FIG. 6, a block diagram of one embodiment of the interrupt controller 50 is shown. In the embodiment of FIG. 6, the interrupt controller 50 includes a register interface unit 120, a mask/software (SW) OR unit 122, an interrupt router 124, and multiple processor schedulers such as processor schedulers 126A-126B. The register interface unit 120 may be coupled to the IC register interface 62, as well as the mask/SW OR unit 122, the interrupt router 124, and optionally the processor schedulers 126A-126B. Generally, the register interface unit 120 may be coupled to any other components in the interrupt controller 50 that may be controlled or updated via register read/write operations on the interface 62. The mask/SW OR unit 122 may include the mask register 56, may be coupled to receive the interrupts from the various interrupt sources in the system, and may be coupled to the interrupt router 124. The interrupt router 124 may be coupled to receive the offline states and other PStates of the processors, may include the timeouts register 58, and may be coupled to the processor schedulers 126A-126B. Each processor scheduler 126A-126B may be coupled to provide an IRQ signal to a correspond processor 60A-60B.

The mask/SW OR unit 122 may be configured to apply the mask to the interrupts received from the interrupt sources (e.g. the peripherals 64A-64B), providing the masked interrupts to the interrupt router 124. In an embodiment, the mask/SW OR unit 122 may also provide a mechanism for software executing on the processors to cause an interrupt (as if the corresponding source had asserted the interrupt). Software may transmit register access operations on the interface 62 to effect the desired interrupts. The mask/SW OR unit 122 may logically OR the software interrupts with the actual interrupts received from the respective sources to produce each interrupt, and may mask the logically ORed interrupts according to the mask register 56 to produce the masked interrupts. Other embodiments may not implement the software OR and may simply mask the interrupts received from the interrupt sources to provide the masked interrupts to the interrupt router 124.

The interrupt router 124 may receive the masked interrupts, and may be configured to route interrupts to processors based on the offline state, the PStates, the timeouts, etc. That is, the interrupt router 124 may implement the flowchart of FIG. 2, in one embodiment. The interrupt router may signal the processor scheduler 126A-126B corresponding to the processor to which the interrupt is routed.

Each processor scheduler 126A-126B may be configured to assert the IRQ signal to the corresponding processor 60A-60B responsive to receiving an interrupt from the interrupt router 124. The IRQ signal may be the general interrupt request signal. Various processor implementations may also support special-purpose interrupts or other interrupts as well. For example, some embodiments may support a low-latency interrupt in addition to the IRQ. Embodiments may support various timer interrupts in addition to the external device interrupts shown in FIG. 6. The processor scheduler 126A-126B may be configured to schedule the timer interrupts on the IRQ signal in addition to the external device interrupts, and/or may schedule the timer interrupts on other interrupts and may schedule the other types of interrupts.

The register interface unit 120 may be configured to decode the register access operations from the interface 62, and to interact with other components of the interrupt controller 50 to complete the register access operations. For register read operations the register interface unit 120 may be configured to return the read data from the register read operation to the initiating processor. The register interface unit 120 may be configured to decode the address of the register access operation to determine which register is being accessed. Additionally, the source processor may further identify which register is being accessed (e.g. for per-processor registers such as the IAck register for IAck commands).

Figure 7:
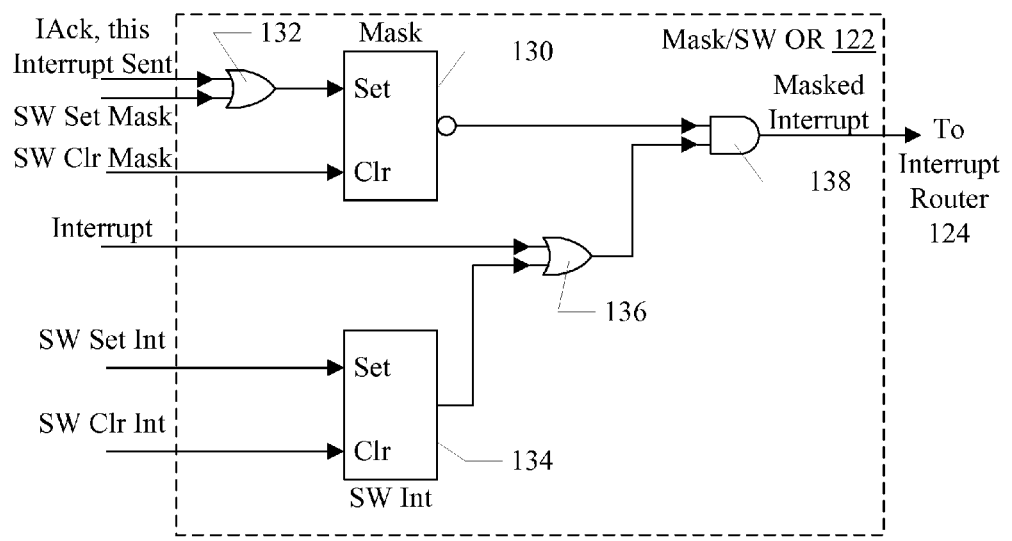
FIG. 7 is a block diagram of one embodiment of mask/SW Or circuit shown in FIG. 6.

Turning now to FIG. 7, a block diagram of one embodiment of a portion of the mask/SW OR unit 122, corresponding to one interrupt, is shown. Similar circuitry may be provided for each other interrupt. The circuitry shown in FIG. 7 is one embodiment illustrating operation of the unit 122, and other implementations may be used including any Boolean equivalents of the circuitry shown in FIG. 7. The embodiment of FIG. 7 includes a mask flop 130, an OR gate 132, a software interrupt flop 134, an OR gate 136, and an AND gate 138.

The mask flop 130 may store the mask bit for the interrupt (and thus may be part of the mask register 56, along with similar flops for other interrupts). The mask bit may be set in this embodiment to mask the interrupt and clear to unmask the interrupt. Accordingly, an inverted output of the mask flop 130 is provided to the AND gate 138 to mask the interrupt (either hardware or software generated) that is output by the OR gate 136. That is, if the mask bit is set, the inverted output of mask flop 130 is clear and the output of the AND gate 138 is clear. If the mask bit is clear, the inverted output of the mask flop 130 is set and the interrupt passes through the AND gate 138 as the masked interrupt. Thus, in this embodiment, interrupts are active high. Other embodiments may use active low interrupts and a NAND gate may be used. The OR gate 136 logically ORs the external interrupt with the output of the software interrupt flop 134. Accordingly, if either the external (hardware) interrupt is asserted or software has asserted the interrupt, the interrupt output by the OR gate 136 is asserted.

The mask bit may be set in the flop 130 responsive to either an IAck cycle which causes this interrupt to be delivered to the acknowledging processor, or software sets the mask via a write to the set mask register (OR gate 132). The setting of the mask bit automatically in response to the IAck cycle by the interrupt controller hardware may implement the atomic setting of the mask bit. The next IAck cycle may thus receive a different interrupt (since this interrupt is now masked), and thus the race condition for reading interrupts by multiple processors may be properly handled. Permitting software to also set the mask bit may allow software to effectively disable an interrupt. Software may also clear the mask bit, after servicing the interrupt, for example.

In the illustrated embodiment, software may set mask bits in the mask register 56 by executing a write operation to a set mask register. Set bits in the write data may identify which mask bits to set. The register interface unit 120 may decode the set mask register write, and may assert the SW set mask signals based on the write data. Similarly, software may execute a write operation to a clear mask register, and set bits in the write data may identify which mask bits to clear. The register interface unit 120 may decode the clear mask register write, and may assert the SW clr mask signals based on the write data.

In a similar fashion, software may trigger one or more interrupts with a set interrupt register write operation. The write data may identify which interrupt bits to set, and the register interface unit 120 may assert corresponding SW set int signals to set the flops 134. To clear a software-generated interrupt, software may issue a clear interrupt register write operation. The write data may identify which interrupt bits to clear (e.g. with set bits in the write data at corresponding bit positions), and the register interface unit 120 may assert the corresponding SW clr int signals.

Both the flops 130 and 134 are illustrated as having set and clear inputs. The flops may be implemented in any desired fashion (e.g. set-reset (SR) flops, D flops with logic to set or clear the flop based on the set or clear inputs, etc.).

Figure 8:
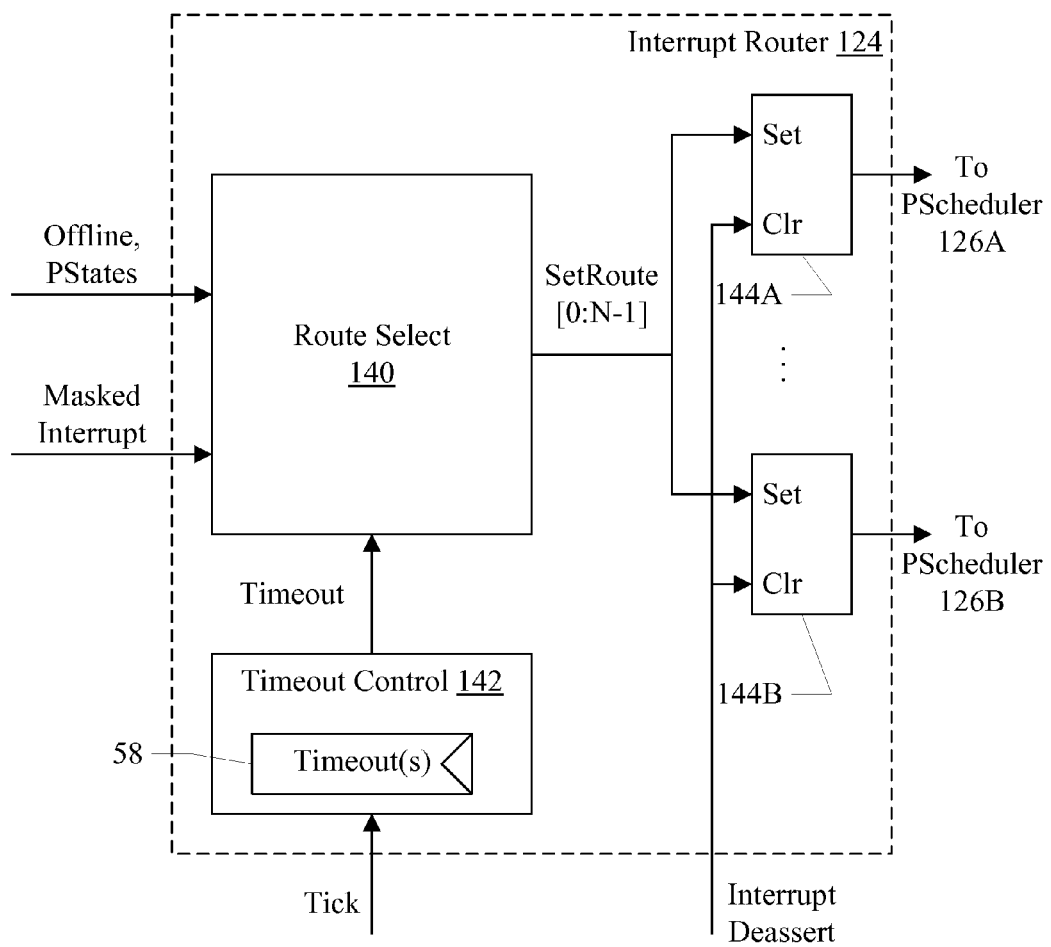
FIG. 8 is a block diagram of one embodiment of an interrupt router circuit shown in FIG. 6.

FIG. 8 is a block diagram of one embodiment of the interrupt router 124 for one of the interrupts. Similar circuitry may be provided for each other interrupt. In the embodiment of FIG. 8, the interrupt router 124 may include a route select circuit 140, a timeout control unit 142 (that includes the timeouts register 58), and a set of routed flops 144A-144B. There may be one routed flop 144A-144B for each processor 60A-60B.

The route select circuit 140 may receive the offline state and PStates, as well as the masked interrupt from the mask/SW OR unit 122. The route select circuitry 140 may implement the operation illustrated in FIG. 2 to identify eligible processors (block 70) and select the eligible processors (block 72). In some embodiments, the route select circuit 140 may implement the embodiments illustrated in FIGS. 4 and 5. The route select circuit 140 may output SetRoute signals (one signal for each processor that is configured to service interrupts). The SetRoute signal for the selected processor may be asserted, and the other SetRoute signals may be deasserted. Each SetRoute signal may be coupled to the set input of respective flops 144A-144B, which may be the output signals to the PSchedulers 126A-126B respectively.

In this embodiment, the interrupt may remain routed to a given processor until the masked interrupt is deasserted ("interrupt deassert", coupled to the clear input of each flop 144A-144B). That is, the interrupt remains routed until it is accepted by a processor. Accordingly, even if the interrupt times out and the interrupt is routed to another processor, it also remains routed to the "timed out" processor. In this manner, if the processor times out but is subsequently ready to respond to the interrupt, the IRQ to that processor may still be asserted at the subsequent time. Other embodiments may clear the routed state at the timeout or at any time the interrupt is offered to another processor.

The timeout control unit 142 may include the circuitry to measure the timeouts, based on the timeout values programmed into the registers 58. That is, the timeout control unit may include counters to count the time between IRQ assertion and acceptance (or timeout) for the processor timeout and to count the time between routing the interrupt to a given processor and the servicing of the interrupt (or timeout of the interrupt). If a timeout is detected, the timeout control unit 142 may be configured to assert the timeout to the route select circuit 140, which may re-evaluate the interrupt and select a processor to route the interrupt to. The timeout control unit 142 may implement the operation illustrated in blocks 76 and 80 of FIG. 2 (and the route select 110 may implement block 82 in response to the timeout).

Figure 9:
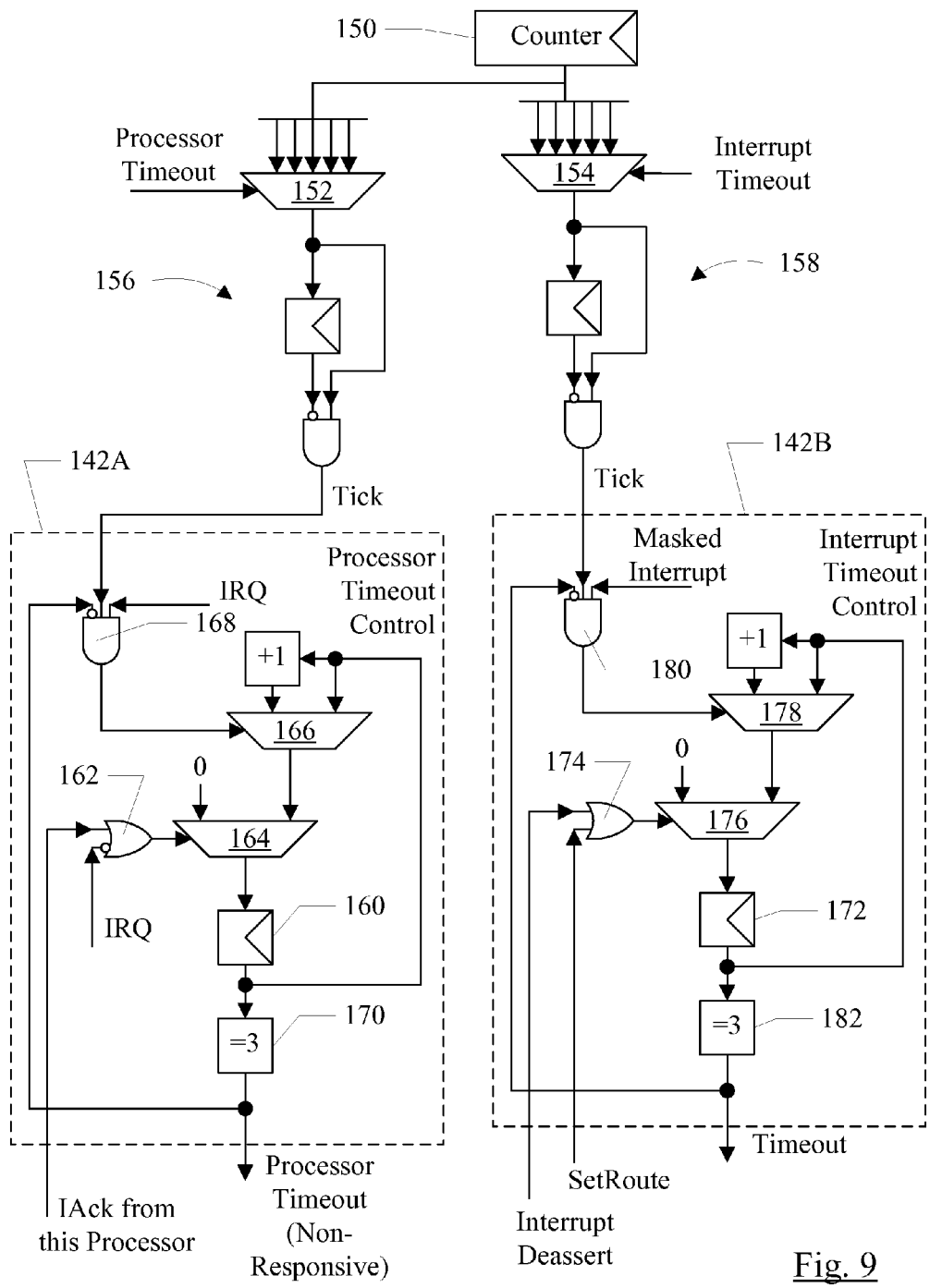
FIG. 9 is a block diagram illustrating one embodiment of timeouts in the interrupt controller shown in FIG. 6.

It is noted that the timeout control unit 142 may implement 2 counters per interrupt, and there may be a relatively large number of interrupts. In an embodiment, a counter may be shared by the various timeouts to reduce the hardware cost for the timeout counters. An embodiment that may accomplish the sharing is shown in FIG. 9. In the embodiment of FIG. 9, a free-running counter 150 is shown which increments each clock cycle of a clock input to the counter. The counter 150 may implement any number of bits in various embodiments, based on the frequency of the clock that clocks the counter and the desired ranges of the timeouts.

The bits of the counter 150 may be coupled to multiplexors 152 and 154. The multiplexor 152 is controlled based on the processor timeout from the timeouts register 58, and the multiplexor 154 is controlled based on the interrupt timeout from the timeouts register 58. More particularly, the bit that is selected by the muxes 152 and 154 may be the bit that is expected to change state to a logical one twice within the requested timeout period. The selected bit is then fed to rising edge detection circuitry 156 and 158, respectively, which generates a tick signal. The tick signal is asserted each time the selected bit changes from a logical zero to a logical one.

The tick signal from the circuitry 156 may be coupled to the processor timeout control unit 142A. The processor timeout control unit 142A may be configured initialize a timeout counter 160 to zero in response to an IAck from the corresponding processor or in response to the IRQ being deasserted (OR gate 162 and mux 164). Otherwise, the output of the mux 166 is selected. The mux 166 may be configured to select the current value from the counter 160 unless the tick signal is asserted, the IRQ for the processor is asserted, and the timeout has not yet been detected (AND gate 168), in which case the incremented value is selected. Thus, each assertion of the tick signal may cause the timeout counter 160 to increment if the IRQ is asserted, until the timeout is reached.

A comparator 170 is coupled to the output of the counter 160, and may be configured to compare the counter to 3. If the counter is three, then a timeout may be detected. Since the counter bit from the counter 150 is selected to toggle high twice within the selected timeout period, counting three ticks of the tick signal may ensure that the timeout has been exceeded. While the timeout may not be perfectly accurate in this case, the accuracy may be sufficient for the purposes of the interrupt controller 50 while implementing only a two bit counter 160 for each timeout and sharing the free-running counter 150. The processor timeout control unit 142A may signal the timeout, indicating that the processor is non-responsive.

The interrupt timeout control unit 142B may be similar to the processor timeout control unit 142A, using the tick signal from the circuitry 158. In the case of the interrupt timeout control unit 142B, the timeout may be measured from the routing of the interrupt to a processor to the servicing of the interrupt (e.g. to masked interrupt deassertion). The counter 172 may be initialized to zero through the mux 176 in response to deassertion of the interrupt or routing of the interrupt to any processor (OR gate 174). Subsequently, the counter may be incremented through mux 178 responsive to a tick while the masked interrupt is still asserted (AND gate 180). The timeout may be asserted when the comparator 182 detects that the counter 172 has reached three.

It is noted that, while specific logic circuitry is illustrated in FIG. 9 for the control units 142A-142B (which may both be part of the timeout control unit 142 shown in FIG. 8, in this embodiment), other embodiments may use any logic circuitry. Particularly, any Boolean equivalents of the illustrated circuitry may be used. Additionally, more timers may be used to detect various other timeouts, in other embodiments, as desired.

Figure 10:
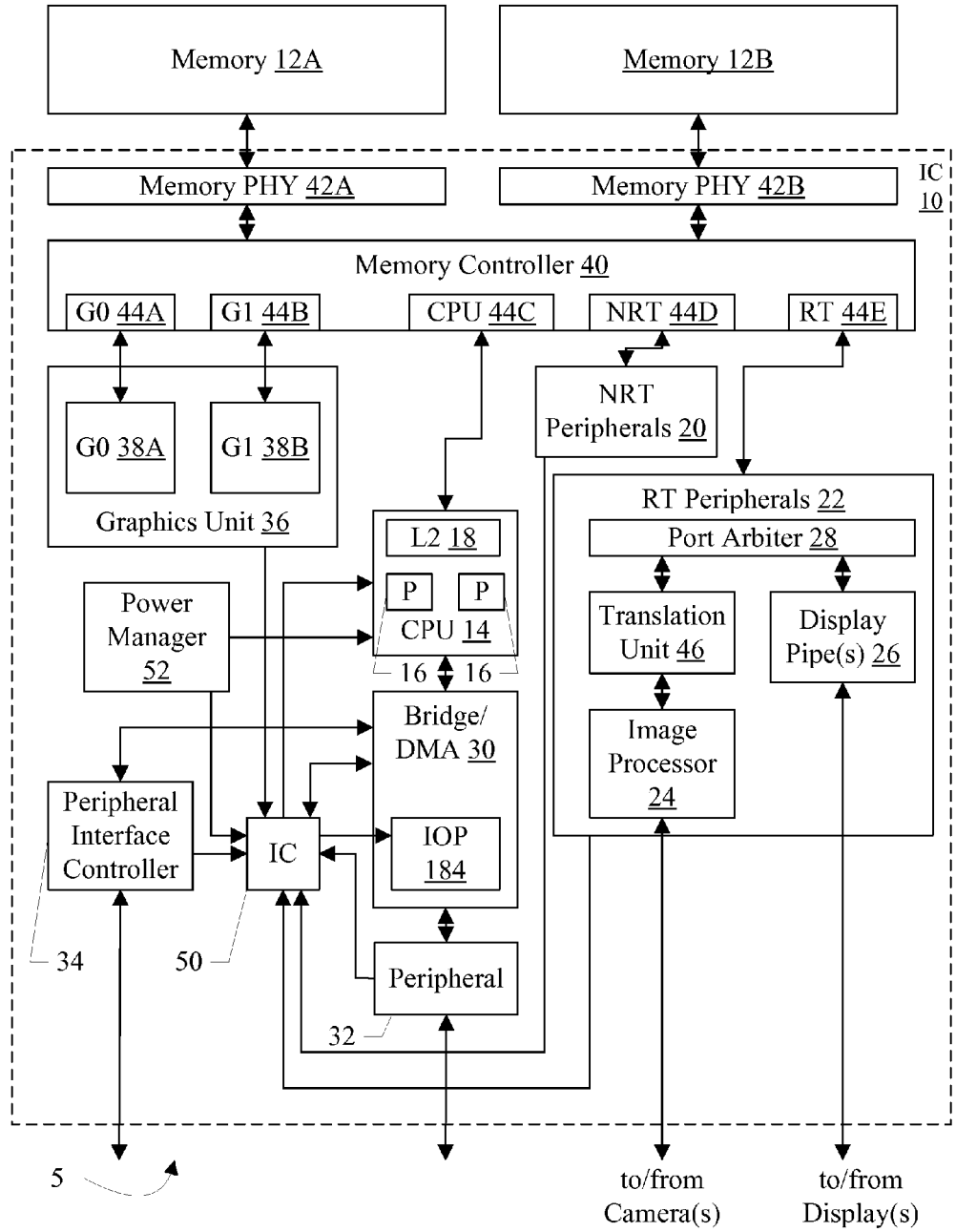
FIG. 10 is a block diagram of another embodiment of a system including an interrupt controller.

Turning now to FIG. 10, a block diagram of another embodiment of the system 5 is shown. In the embodiment of FIG. 10, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the RT peripherals include an image processor 24, one or more display pipes 26, a translation unit 46, and a port arbiter 28. Other embodiments may include more or fewer image processors 24, more or fewer display pipes 26, and/or any additional real time peripherals as desired. The image processor 24 may be coupled to receive image data from one or more cameras in the system 5. Similarly, the display pipes 26 may be coupled to one or more display controllers (not shown) which control one or more displays in the system. The image processor 24 may be coupled to the translation unit 46, which may be further coupled to the port arbiter 28. The port arbiter 28 may be coupled to the display pipes 26 as well. In the illustrated embodiment, the CPU block 14 is coupled to a bridge/direct memory access (DMA) controller 30, which may be coupled to one or more peripheral devices 32 and/or one or more peripheral interface controllers 34. The bridge/DMA controller 30 may include an I/O processor (IOP) 184). The number of peripheral devices 32 and peripheral interface controllers 34 may vary from zero to any desired number in various embodiments. The system 5 illustrated in FIG. 1 further includes a graphics unit 36 including one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. The number of memory PHYs 42A-42B and corresponding memories 12A-12B may be one or more than two in other embodiments. The interrupt controller 50 and the power manager 52 are illustrated in FIG. 10 as well (and may include the offline register 54, and the mask register 56 and timeouts register 58, respectively, as shown in FIG. 1).

In the illustrated embodiment, the interrupt controller 50 may receive interrupts from the peripheral interface controller 34, the peripherals 32, the graphics units 38A-38B, the RT peripherals 22, and the NRT peripherals 20. Accordingly, in this embodiment, the peripheral interface controller 34, the peripherals 32, the graphics units 38A-38B, the RT peripherals 22, and the NRT peripherals 20 may be examples of the peripherals 64A-64B in FIG. 1. In other embodiments, interrupts from subsets of the above may be received by the interrupt controller 50. In the illustrated embodiment, either of the processors 16 may service interrupts and the IOP 184 may service interrupts. Accordingly, in this embodiment, the processors 16 and the IOP 184 may be examples of the processors 60A-60B in FIG. 1.

Additionally, in this embodiment, the IC register interface 62 may pass from the processors 16 through the CPU block 14 to the bridge/DMA controller 30, then to the interrupt controller 50. More particularly, the bridge/DMA controller 30 may include a programmed I/O (PIO) controller that masters PIO operations. The register access operations may be PIO operations in this embodiment.

In one embodiment, each port 44A-44E may be associated with a particular type of traffic. For example, in one embodiment, the traffic types may include RT traffic, NRT traffic, and graphics traffic. Other embodiments may include other traffic types in addition to, instead of, or in addition to a subset of the above traffic types. Each type of traffic may be characterized differently (e.g. in terms of requirements and behavior), and the memory controller may handle the traffic types differently to provide higher performance based on the characteristics. For example, RT traffic requires servicing of each memory operation within a specific amount of time. If the latency of the operation exceeds the specific amount of time, erroneous operation may occur in the RT peripheral. For example, image data may be lost in the image processor 24 or the displayed image on the displays to which the display pipes 26 are coupled may visually distort. RT traffic may be characterized as isochronous, for example. On the other hand, graphics traffic may be relatively high bandwidth, but is not latency-sensitive. NRT traffic, such as from the processors 16, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g. traffic to storage devices such as magnetic, optical, or solid state storage). By providing ports 44A-44E associated with different traffic types, the memory controller 40 may be exposed to the different traffic types in parallel.

As mentioned above, the RT peripherals 22 may include the image processor 24 and the display pipes 26. The display pipes 26 may include circuitry to fetch one or more image frames and to blend the frames to create a display image. The display pipes 26 may further include one or more video pipelines, and video frames may be blended with (relatively) static image frames to create frames for display at the video frame rate. The result of the display pipes 26 may be a stream of pixels to be displayed on the display screen. The pixel values may be transmitted to a display controller for display on the display screen. The image processor 24 may receive camera data and process the data to an image to be stored in memory.

Returning to the memory controller 40, generally a port may be a communication point on the memory controller 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 such as the display pipes 26 and the image processor 24 may share the RT port 44E. A port may be coupled to a single interface to communicate with the one or more sources. Thus, when sources share an interface, there may be an arbiter on the sources' side of the interface to select between the sources. For example, the L2 cache 18 may serve as an arbiter for the CPU port 44C to the memory controller 40. The port arbiter 28 may serve as an arbiter for the RT port 44E, and a similar port arbiter (not shown) may be an arbiter for the NRT port 44D. The single source on a port or the combination of sources on a port may be referred to as an agent. Each port 44A-44E is coupled to an interface to communicate with its respective agent. The interface may be any type of communication medium (e.g. a bus, a point-to-point interconnect, etc.) and may implement any protocol. In some embodiments, the ports 44A-44E may all implement the same interface and protocol. In other embodiments, different ports may implement different interfaces and/or protocols. In still other embodiments, the memory controller 40 may be single ported.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. Each memory operation may include a flow ID (FID). The FID may identify a memory operation as being part of a flow of memory operations. A flow of memory operations may generally be related, whereas memory operations from different flows, even if from the same source, may not be related. A portion of the FID (e.g. a source field) may identify the source, and the remainder of the FID may identify the flow (e.g. a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. In some embodiments, different traffic types may have different definitions of QoS parameters. That is, the different traffic types may have different sets of QoS parameters.

The memory controller 40 may be configured to process the QoS parameters received on each port 44A-44E and may use the relative QoS parameter values to schedule memory operations received on the ports with respect to other memory operations from that port and with respect to other memory operations received on other ports. More specifically, the memory controller 40 may be configured to compare QoS parameters that are drawn from different sets of QoS parameters (e.g. RT QoS parameters and NRT QoS parameters) and may be configured to make scheduling decisions based on the QoS parameters.

In some embodiments, the memory controller 40 may be configured to upgrade QoS levels for pending memory operations. Various upgrade mechanism may be supported. For example, the memory controller 40 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 40 may be configured to push pending memory operations from the same port or source, but not the same flow, as a newly received memory operation specifying a higher QoS level. As another example, the memory controller 40 may be configured to couple to a sideband interface from one or more agents, and may upgrade QoS levels responsive to receiving an upgrade request on the sideband interface. In another example, the memory controller 40 may be configured to track the relative age of the pending memory operations. The memory controller 40 may be configured to upgrade the QoS level of aged memory operations at certain ages. The ages at which upgrade occurs may depend on the current QoS parameter of the aged memory operation.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler/rotator circuitry, image compression/decompression circuitry, etc.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WiFi) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 11:
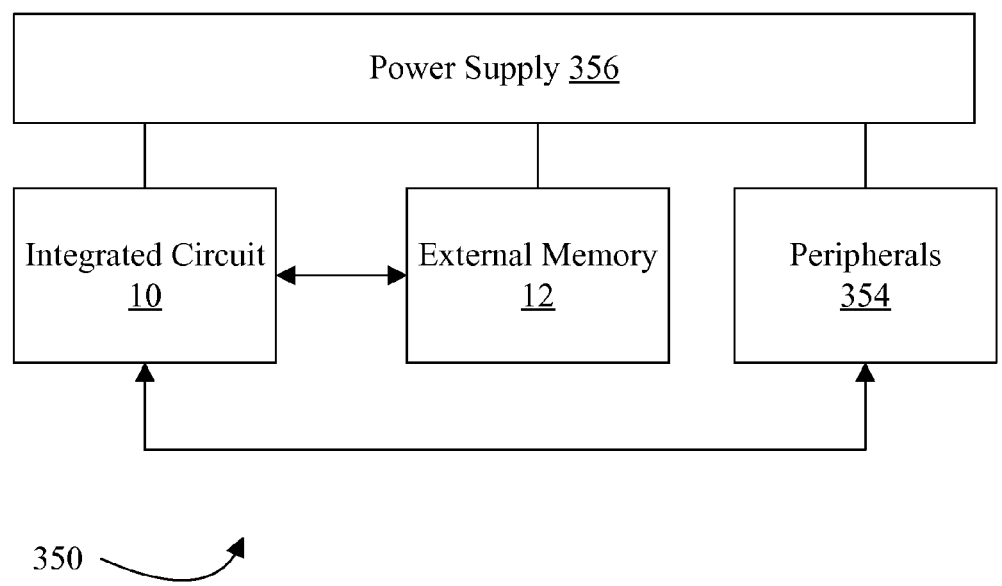
FIG. 11 is a block diagram of yet another embodiment of a system.

Turning next to FIG. 11, a block diagram of one embodiment of a system 350 is shown. In the illustrated embodiment, the system 350 includes at least one instance of the integrated circuit 10 coupled to external memory 12 (e.g. the memory 12A-12B in FIG. 10). The integrated circuit 10 may also be an integrated circuit incorporating some or all of the components shown in FIG. 1. The integrated circuit 10 is coupled to one or more peripherals 354 and the external memory 12. A power supply 356 is also provided which supplies the supply voltages to the integrated circuit 10 as well as one or more supply voltages to the memory 12 and/or the peripherals 354. In some embodiments, more than one instance of the integrated circuit 10 may be included (and more than one external memory 12 may be included as well).

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. An interrupt controller comprising:
circuitry coupled to one or more devices in a system to receive interrupts from the one or more devices; and
an interrupt router coupled to the circuitry, wherein the interrupt router is configured to:
select a processor from a plurality of processors in the system for a first interrupt received from one of the devices;
signal the first interrupt only to the selected processor from the plurality of processors;
initialize a timeout counter to a first timeout value in response to signaling the first interrupt to the selected processor, wherein the first timeout value is one of a plurality of timeout values and is selected responsive to a state of the selected processor, and wherein the state includes whether or not interrupts are enabled in the selected processor, wherein a given timeout value of the plurality of timeout values corresponds to the state in which interrupts are disabled in the selected processor, and wherein the given timeout value is dependent on a typical amount of time that interrupts are disabled in the selected processor;
select another processor for the first interrupt responsive to detecting expiration of the timeout counter for the interrupt without a response from the selected processor; and
signal the first interrupt to the other processor responsive to selecting the other processor.

2. The interrupt controller as recited in claim 1, wherein the first timeout value is selected further responsive to a state of a second processor of the plurality of processors.

3. The interrupt controller as recited in claim 2, wherein the second processor is the other processor to be selected responsive to expiration of the timeout counter for the selected processor.

4. The interrupt controller as recited in claim 1, wherein the response is an interrupt acknowledgement response.

5. The interrupt controller as recited in claim 1, wherein the state includes whether or not the selected processor is in a low power state.

6. The interrupt controller as recited in claim 5, wherein a second given timeout value of the plurality of timeout values corresponds to the low power state and is higher than a third timeout value of the plurality of values that corresponds to a full on state of the selected processor.

7. The interrupt controller as recited in claim 6, wherein the second given timeout value is dependent on an amount of time used to transition the selected processor from the low power state to the full on state.

8. The interrupt controller as recited in claim 1, wherein the state includes an offline state programmed by software executing on the system.

9. The interrupt controller as recited in claim 1, wherein the state includes an indication of a virtualized guest operating system being executed on the selected processor.

10. A system comprising:
a plurality of devices;
a plurality of processors; and
an interrupt controller coupled to the plurality of devices and the plurality of processors, wherein the interrupt controller is configured to:
receive a first interrupt from one of the plurality of devices;
select a processor from a plurality of processors for the first interrupt;
signal the first interrupt only to the selected processor from the plurality of processors;
initialize a timeout counter to a first timeout value in response to signaling the first interrupt to the selected processor, wherein the first timeout value is one of a plurality of timeout values and is selected responsive to a state of the selected processor, and wherein the state includes whether or not interrupts are enabled in the selected processor, and wherein a given timeout value of the plurality of timeout values corresponds to the state in which interrupts are disabled in the selected processor, and wherein the given timeout value is dependent on a typical amount of time that interrupts are disabled in the selected processor; and
select another processor for the first interrupt responsive to detecting expiration of the timeout counter for the interrupt without a response from the selected processor; and
signal the first interrupt to the other processor responsive to selecting the other processor.

11. The system as recited in claim 10, wherein the state includes whether or not the selected processor is in a low power state.

12. The system as recited in claim 11, wherein a second given timeout value of the plurality of timeout values corresponds to the low power state and is dependent on an amount of time used to transition the selected processor from the low power state to a full on state.

13. A method comprising:
an interrupt controller receiving an interrupt from a device;
the interrupt controller selecting a selected processor from a plurality of processors in a system including the interrupt controller;
offering the interrupt only to the selected processor from the plurality of processors;
selecting a timeout value from a plurality of timeout values responsive to a state of the selected processor, wherein the state includes whether or not interrupts are enabled in the selected processor, and wherein a given timeout value of the plurality of timeout values corresponds to the state in which interrupts are disabled in the selected processor, and wherein the given timeout value is dependent on a typical amount of time that interrupts are disabled in the selected processor;
initializing a timeout counter with the selected timeout value for the selected processor;
detecting a timeout for the selected processor without receiving an interrupt acknowledgement from the selected processor for the interrupt;
selecting a different processor of the plurality of processors responsive to the timeout; and
offering the interrupt to the different processor responsive to selecting the different processor.

14. The method as recited in claim 13 wherein the state includes whether or not the selected processor is in a low power state.

15. The method as recited in claim 14 wherein a second given timeout value of the plurality of timeout values corresponds to the low power state and is dependent on an amount of time used to transition the selected processor from the low power state to a full on state.

\* \* \* \* \*